Patented Aug. 20, 1940

2,212,134

UNITED STATES PATENT OFFICE 2,212,134

METHOD OF PRODUCING LUMINOUS TUBES

Albert Steadman, Nutley, N. J.

No Drawing. Application November 23, 1938, Serial No. 242,006

1 Claim. (Cl. 91—70)

This invention relates to luminous tubes, and more particularly to such tubes that use gases or vapors, preferably rare gases, in whole or in part, for decorative effects, luminous signs, letters, etc.

In making the usual rare gas signs employing neon, argon, etc., the various color effects, other than the natural color of the rare gases, are obtained by flowing a carrier, such as nitro-cellulose through the glass tubing, the carrier containing in suspension pigments which give the desired color effects when the gas is illuminated. The carrier thus flowed through the tube adheres to the interior wall thereof and is caused to harden and be decomposed by the application of heat, thus leaving the pigment adhering to the glass wall where it serves its intended purpose.

It is the usual practice to use, in addition to the rare gas, such as neon, argon, helium, etc., a small quantity of mercury vapor because of the ultra-violet light value thereof which has proved to be very beneficial in luminous signs of this character.

The manner above described, in common use, of effecting the various color effects is subject to various disadvantages, the principal ones being the unreliable and nonpermanent effect obtained. It has been found, particularly in cases where mercury vapor is employed even in minute quantity, the mercury has a deleterious effect on the tubing in that the condensation of the mercury on the tube wall causes the pigment to be separated from the wall and allows the light of the gas to be seen through the tube, giving a very spotty and consequently a very unsatisfactory visible effect, and materially shortening the permanency of the desired color effect.

I have discovered that these disadvantages, which have heretofore proven to be insurmountable, can be overcome by effecting a virtual impregnation of the pigment into the pores of the glass effected in a particular way and by means of a particular carrier for the pigment which will now be described. I employ shellac in a highly purified state as the carrier for the pigment. Of course any suitable pigment may be employed, depending upon color effect and result desired. For example, zinc ortho silicate (known as willemite) is customarily used for green; calcium tungstate for blue; etc.

The highly purified shellac carrying this pigment, and in liquid form, is flowed through the glass tubing in the same manner that the carriers now in use are flowed, and adherence thereof to the interior wall of the tubing is thus effected. I then subject the tube to heat to decompose the carrier, but I have found that the degree of heat employed is an important factor.

In accordance with my invention I subject the tubing, interiorly coated as above described, to a temperature slightly in excess of the softening temperature of the glass utilized. I find that by so doing I obtain an impregnation of the shellac and/or pigment into the pores of the glass, with the result that a permanency of pigment coating is obtained, unaffected by chemical decomposition or alteration by the gases within the tube even when mercury vapor is employed.

At the present time I am unable to state with certainty the scientific theory of why this effect is obtained. One theory is that the temperature to which the glass is subjected effects a fusion between the hardening shellac and pigment with the glass which renders the pigment less accessible to action by the decomposing chemicals of the vapors and gases within the tube. Another theory is that, at the temperature necessary to cause softening of the glass, the shellac would have been completely decomposed, but the chemical action of decomposition thereof may cause the pigment to effect close adhesion to the glass or some product of the decomposition of shellac may cause close adhesion between the glass and the pigment. In any event, regardless of whether or not either of the above theories, or any of them, is correct the result is that a uniform permanent disposition of the pigment on the glass is effected in such a manner that neither mercury vapor nor condensate therefrom, nor any action from the rare gases affect the pigment coating. In fact, while it is possible to thereafter remove most if not all of the pigment from the interior of the wall this may be done only laboriously by prolonged scraping.

I have found that the results obtained by my invention are materially enhanced if the color pigments, which are usually obtained in crystalline form, are ground to complete deflocculation. I have also found that the results obtained are materially enhanced if when the pigment is ground to complete deflocculation a small amount, for example five percent by weight, of a low fusing salt, such as zinc borate, is added to the grinding mixture for complete mixing with the deflocculated pigment.

From the foregoing it will be apparent that many modifications and changes in details in the method as well as the product produced thereby will occur to those skilled in the art without departing from the spirit and scope of the invention as defined by the claim, but having now set forth the objects and nature of my invention, and having described the product thereof, as well as the method of producing it, what I claim as new and useful and of my own invention and desire to secure by United States Letters Patent is:

The method of coating a glass tube which comprises flowing highly purified shellac containing color pigment in suspension therein, and subjecting the tube to a heat sufficient to soften the glass to thereby impregnate the pigment in the interior wall of the tube.

ALBERT STEADMAN.